United States Patent [19]

Page

[11] 3,908,640

[45] Sept. 30, 1975

[54] CARDIOVASCULAR INSTRUMENT

[76] Inventor: Robert E. Page, 3427 Dumas St., San Diego, Calif. 92106

[22] Filed: Nov. 25, 1974

[21] Appl. No.: 526,987

[52] U.S. Cl. .......................... 128/2.05 T; 128/2.06 F
[51] Int. Cl.² ............................................ A61B 5/02
[58] Field of Search ..... 128/2.05 A, 2.05 P, 2.05 R, 128/2.05 T, 2.06 A, 2.06 F, 2.06 R

[56] References Cited
UNITED STATES PATENTS

| | | | |
|---|---|---|---|
| 3,095,872 | 7/1963 | Tolles | 128/2.05 A |
| 3,132,643 | 5/1964 | Baum et al. | 128/2.05 A |
| 3,599,628 | 8/1971 | Abbenante et al. | 128/2.06 F |
| 3,734,086 | 5/1973 | Phelps, Sr. | 128/2.06 F |
| 3,742,938 | 7/1973 | Stern | 128/2.05 T |

Primary Examiner—William E. Kamm
Attorney, Agent, or Firm—Richard S. Sciascia; Ervin F. Johnston; William T. Skeer

[57] ABSTRACT

A cardiovascular monitoring system employs photoelectric monitoring circuits to obtain analog signals corresponding to the heart beat of the subject. Cooperating amplification circuitry amplifies and shapes the heart beat signals to produce digital electrical pulses. Circuitry is provided which measures the time between adjacent pulses from a single detector or, selectively, adjacent pulses from spaced detectors. Digital read-out circuitry displays this time signal as either the period between adjacent pulses from a single detector or the time difference representing the velocity of blood flow between the spaced points covered by a plurality of detectors.

3 Claims, 8 Drawing Figures $$FLOW = Q = A\left(\frac{dx}{dt}\right)$$

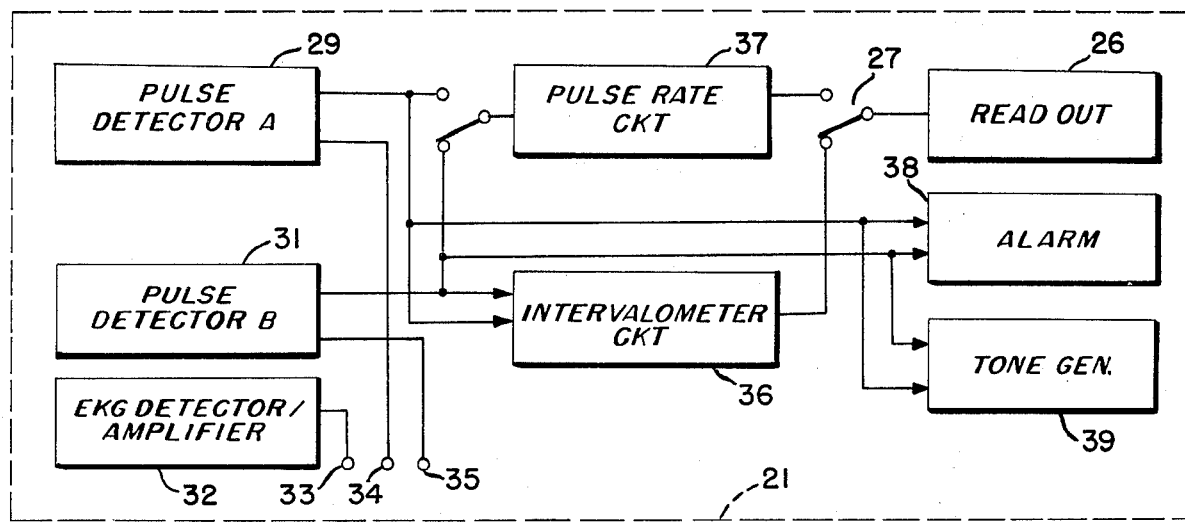
FIG. 4
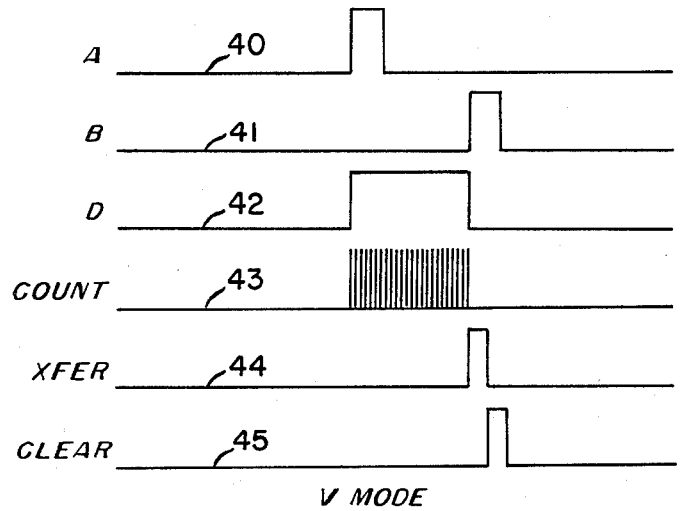
FIG. 5
V MODE
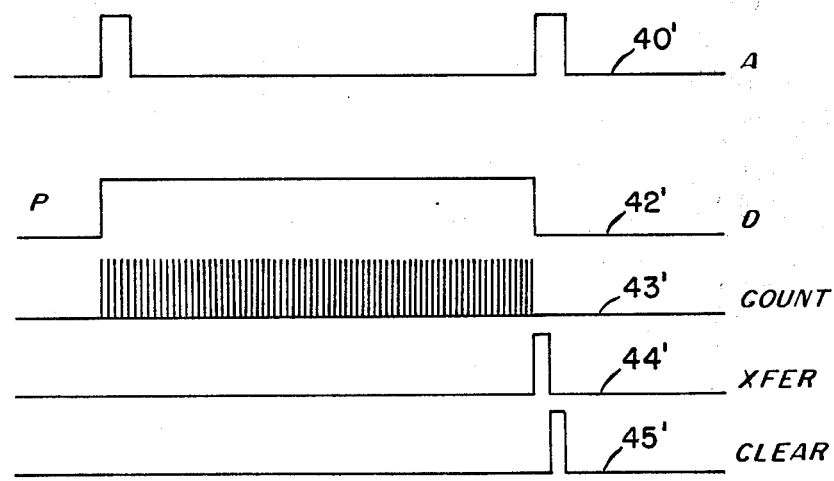
FIG. 6  T MODE

CARDIOVASCULAR INSTRUMENT

STATEMENT OF GOVERNMENT INTEREST

The invention described herein may be manufactured and used by or for the Government of the United States of America for governmental purposes without the payment of any royalties thereon or therefor.

FIELD OF THE INVENTION

The invention pertains to the field of biomedical instrumentation. By way of further explanation, this invention pertains to electronic instrumentation of the cardiovascular condition of a living subject. In still greater particularity, the invention provides selective indications of a plurality of cardiovascular parameters. The invention is further characterized by providing an indication of the period between successive pulse beats and an indication of the velocity of blood flow in the artery of the subject.

DESCRIPTION OF THE PRIOR ART

In modern times, great advances have been made in biomedical instrumentation. Particularly, significant strides have been made in instrumentation pertaining to the circulatory system. Such instrumentation has produced measurements which are particularly significant in the diagnosis of certain abnormal conditions as well as the determination of normal cardiovascular health in a variety of animals including humans.

Tradionally, a physician or biological research worker has listened to the audible pulses produced by the heart of a living organism by mechanically coupling his acoustic sensory channels to the body cavity of the subject. The apparatus permitting this acoustic coupling, termed stethoscope, on the basis of the historical development of cardiovascular instrumentation. In modern times, the field of electronics has provided a plethora of detectors and circuitry to obtain cardiovascular information and to process it for a variety of purposes. These electronic techniques have also been successfully employed to provide other indications of cardiovascular conditions by incorporating such circuitry in conjunction with other instrumentation systems. For example, a useful circuitry implementation is shown in U.S. Pat. No. 3,651,789 for "Blood Pressure Indicator and Noise", issued to Paul H. Egli et al. on Mar. 28, 1972.

It is also known in the biomedical instrumentation arts to use photoelectric detection devices positioned to intercept a light beam passing through a narrow portion of the human body as a biomedical detector. An example of one such device is shown in U.S. Pat. No. 3,628,525 for "Blood Oxygenation and Pulse Rate Monitoring Apparatus", issued to Michael L. Polanyi on Dec. 22, 1971. In this example of the prior art, the ear lobe of the patient is monitored by light transmission and the detected signal is used to determine the amount of oxygen in the blood stream of the patient. Similarly, electronic instrumentation has been employed successfully to monitor fetal circulatory conditions in the presence of the circulatory environment of the patient. The aforedescribed systems and others are mere examples of the large fund of clinical instrumentation knowledge. In general, however, only small inroads have been made into the ordinary doctor-patient or scientist-subject relationships. In general, these more commonly encountered situations are still dependent upon stethoscopes and craniometers.

The traditional methods of obtaining cardiovascular instrumentation leave a great deal to be desired, both in the accuracy of the information obtained and the relevance of the information obtained to the normal conditions of the subject. Particularly, the latter short coming is apparent in situations in which the normal condition is influenced by psychologically generated stresses caused by the circulatory monitoring process itself. Such processes create this strain by using intrusive cuffs which stop circulatory flow and the excessive length of time required to make conventional measurements while the subject awaits the outcome.

Thus, there has been a need for an instrument which would provide a rapid cardiovascular measurement without psychological intrusion on the patient or subject and which would require a minimum of expenditure of time by training personnel in obtaining the information. Additionally, a system which would reveal short term variations in the cardiovascular system of the subject has been a long-felt, unsatisfied need in the clinical investigative fields.

SUMMARY OF THE INVENTION

The invention provides a cardiovascular instrument which measures the time duration between successive heart beats of the patient as well as measuring the difference in time of arrival of pulse at spaced points on the subject undergoing investigation. This information is obtained by using a plurality of spaced photoelectric detectors which have their outputs amplified and processed to operate a dual range intervalometer and associated display apparatus. Additionally, provision is made for use of the invention in conjunction with conventional instrumentation.

STATEMENT OF THE OBJECTS OF THE INVENTION

As a primary object of this invention to provide an improved cardiovascular instrumentation system.

Another object of the present invention is to provide an improved pulse monitoring instrument.

Still another object of the present invention is to provide a cardiovascular instrument system having a rapid response time.

Still another object of the present invention is to provide a cardiovascular instrumentation system using time intervals as a measure of cardiovascular condition of the subject.

Still a further object of the present invention is to provide a cardiovascular instrumentation system which selectively reads out the pulse period and the blood flow velocity.

Yet another object of the present invention is to provide a cardiovascular instrumentation system having a nonevasive photoelectric input.

Still a further object of the present invention is to provide a cardiovascular instrumentation system which may be conveniently used by personnel having little professional training.

These and other objects of the invention will become more readily apparent from the ensuing specification when taken together with the drawings.

BRIEF DESCRIPTION OF THE DRAWINGS

FIG. 4 is a diagrammatic illustration showing how the system of the invention can be incorporated into a more complex cardiovascular instrumentation system;

FIG. 5 is a graphic representation of the timed weight forms used in the cardiovascular system of the invention in the velocity mode;

FIG. 6 is a diagrammatic showing of the various weight forms used in the cardiovascular system of the invention in the period mode;

DESCRIPTION OF THE PREFERRED EMBODIMENTS

Figures 1, 2, 3:
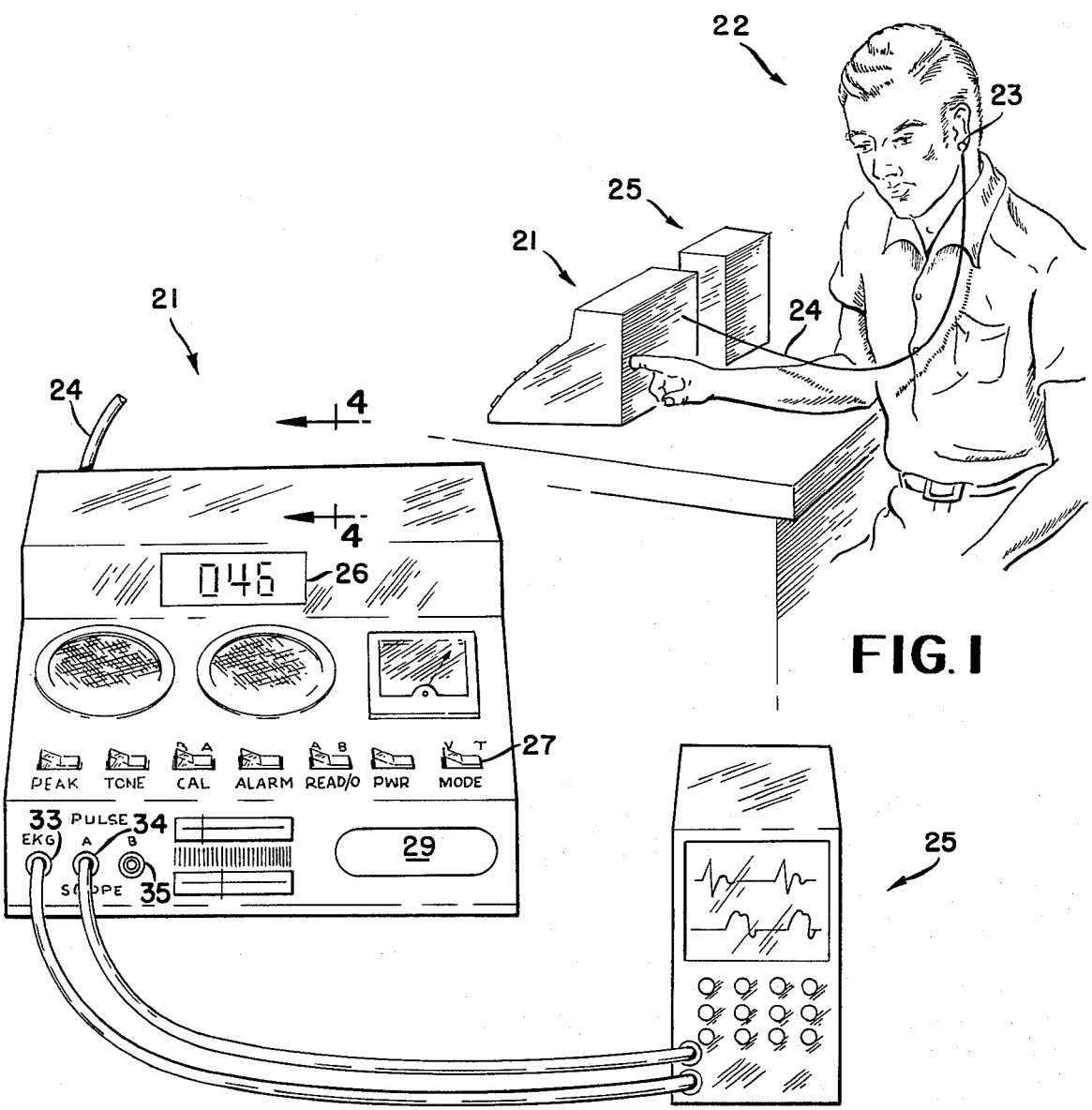
FIG. 1 is a perspective view showing the cardiovascular instrument of the invention in use.
FIG. 2 is a perspective view showing the cardiovascular instrumentation system including the front panel arrangements.
FIG. 3 is a diagrammatic view of a portion of the circulatory system of the patient shown in FIG. 1.

Referring to FIG. 1, a patient 22 is shown in operative relation to the system of the invention. As illustrated, patient 22 has a finger inserted in an aperture in the back of instrument console 21 and has an ear detection to electric transducer 23 which is connected via cable 24 to instrument console 21. As illustrated, auxiliary instrument such as oscilloscope 25 may be used in conjunction with console 21 to provide a more complete diagnostic measurement tool.

Referring to FIG. 2 it may be seen that instrument console 21 obtains a plurality of vibration and operational controls including a mode switch 27. A digital read-out 26 displays a time related signal to be more completely described as is conventional a hinged or otherwise easily removable panel 29 conceals additional operational controls. As illustrated, oscilloscope 25 is connected to console 21 via conventional connector outputs such as illustrated at 33 and 34. Additional output 35 may be selected by appropriate cabling changes to display another pulse signal on oscilloscope 25 if desired.

The operation of the various controls and functions of the illustrated controls may be conventional and, for example, may be those shown in the copending patent of Robert E. Page for "Pulse Rate Indicator", now U.S. Pat. No. 3,841,314. Similarly, the photoelectric transducers included within console 21 and within ear piece 23 may be those shown in the above referenced patent which teachings are incorporated herein by reference.

Referring to FIG. 3 a length of the blood vessel of patient 22 is illustrated at 28. The represented length X in the cross sectional area of the blood vessel 28 indicated at A may be considered as parameters in a fixed dimension conduit. Thus, it may be seen that the flow through blood vessel 28 is equal to the cross sectional area A times the time differential of the flow therethrough. Thus, when the area of blood vessel 28 is restricted, as in the case of some cardiovascular diseases, the rate of flow must be increased to provide the necessary blood flow through the various organs of patient 22. This increased blood flow is of course, accomplished by an elevated blood pressure within subject 22. Thus, the velocity of blood flow in patient 22 provides a reliable index of the blood pressure of this patient.

Of course, blood vessel 28 is somewhat elastic and, depending upon the age of patient 22, may have minor secondary effects upon the pressure to flow-rate index. However, investigation has shown that the limits of elasticity has a minor or secondary effect upon the velocity of flow in comparison with the blood pressure. Thus, the measurement of the blood flow provides a rapidly obtained and clinically useful measure of the circulatory pressure of patient 22.

As illustrated in FIG. 1, the pulse may be monitored at spaced points on the anatomy of subject 22 by means of an ear lobe detector 23 and a finger tip detector located within console 21. Of course, other locations are amenable to simultaneous monitoring as well as the two illustrated and, with modifications of pulse detector 23, the pulse at spaced points along a single portion of the anatomy of subject 22 is possible. For example, a suitable cuff or transducer mounting arrangement may position detector 23 at a spaced point along the forearm of patient 22 at an accurately determined distance from finger tip of the same arm. However, it should be noted that the finger tip/ear relationship has proven a valuable, easily obtained reference index on a wide variety of subjects of different physical stature.

As is more completely treated in the referenced Page patent, the pulse rate of a patient depends upon converting the easily obtained pulse period into a conventional pulse rate figure. Such a conversion complicates and increases the cost of the diagnostic instrument and has been found to be unnecessary. That is, personnel may be rapidly familiarized with the corresponding pulse periods as indices of normalcy rather than the conventional pulse rate. Such training is particularly rapid when the medical technician has had no previous experience with conventional instrumentation and is trained to use a system of the invention. Thus, a rapid selection between the pulse period and pulse velocity may be made with mode switch 27 and the pertinent data recorded on the patient's examination form. Additional advantages of this system will become more apparent as the operational details of the system is further discussed.

Referring to FIG. 4 a system is illustrated which may be conveniently housed within console 21 to incorporate both the pulse rate capability and velocity capability within a single system having both alarm and audible read-out similar to that discussed in the aforerecited Page patent. A pulse detector 30 and pulse detector 31 have their outputs selectively monitored by a pulse rate circuit 37. Pulse rate circuit 37 may include circuitry to determine the actual pulse rate or, if desired, the pulse period. Also housed within console 21 is an EKG detector/amplifier 32, the output of which is fed to external terminal 33. Similarly, the output of pulse detector 30 and 31 are fed respectively to output terminals 34 and 35. Intervolameter circuit 36 is connected to both pulse detector A and pulse detector B and as previously discussed, measures the interval between pulses in each channel. A read-out 26 may be connected, via switch 27, to either pulse rate circuit 37 or intervolameter circuit 36. An alarm 38 is provided to sound a signal or otherwise alert personnel if the cardiovascular activity of subject 22 departs from a prestablished norm. Similarly, a tone generator 39 may provide an audible tone to accompany each pulse beat of subject 22.

Referring to FIGS. 5 and 6, the operational wave forms accompanying the aforedescribed cardiovascular monitoring circutry is illustrated. Wave form 40 illustrates the processed pulse detection obtained from pulse detector 30. Similarly, curve 41 illustrates the processed electrical pulse output of pulse detector 31. Curve 42 indicates a control signal which is initiated by the pulse signal 40 and terminated by pulse signal 41. This control signal is used to gate a clock signal generator to produce a plurality of count pulses indicated at curve 43 for the duration of the control pulse of curve 42. Termination of control pulse 42 initiates a transfer pulse 44 which in turn initiates a clear pulse 45. The function and purpose of such pulses are conventional and will be well understood by persons familiar with the digital processing and display technology and refer to transferring the accumulated count signal into the display registers and clearing of said registers for the next count signal input after such count signal has been stored therein.

As noted above, FIG. 6 illustrates the complimentary control diagrams when the invention is placed in the pulse period mode. In this mode it will be noted that only a single electrical pulse signal is used and, in this case, may correspond to the output of pulse detector 30 indicated at 40'. The control signal illustrated at 42' is initiated and terminated by successive pulses from the same pulse detector such that the control pulse period is substantially longer than for the velocity mode illustrated in FIG. 5. Thus, count signal 43 includes a longer train of count pulses. It should be noted at this juncture that, if desired, the count pulses comprising signal 43' may be of a different time base than those used for signal 43. It has been found convenient for example, to decimally relate the two pulse count signals such that those used for count signal 43' had one tenth the frequency of those used in count signal 43. Transfer pulse 44' and clear pulse 45' are generated in a similar fashion to transfer pulse 44 and clear pulse 45 discussed above.

Figure 7:
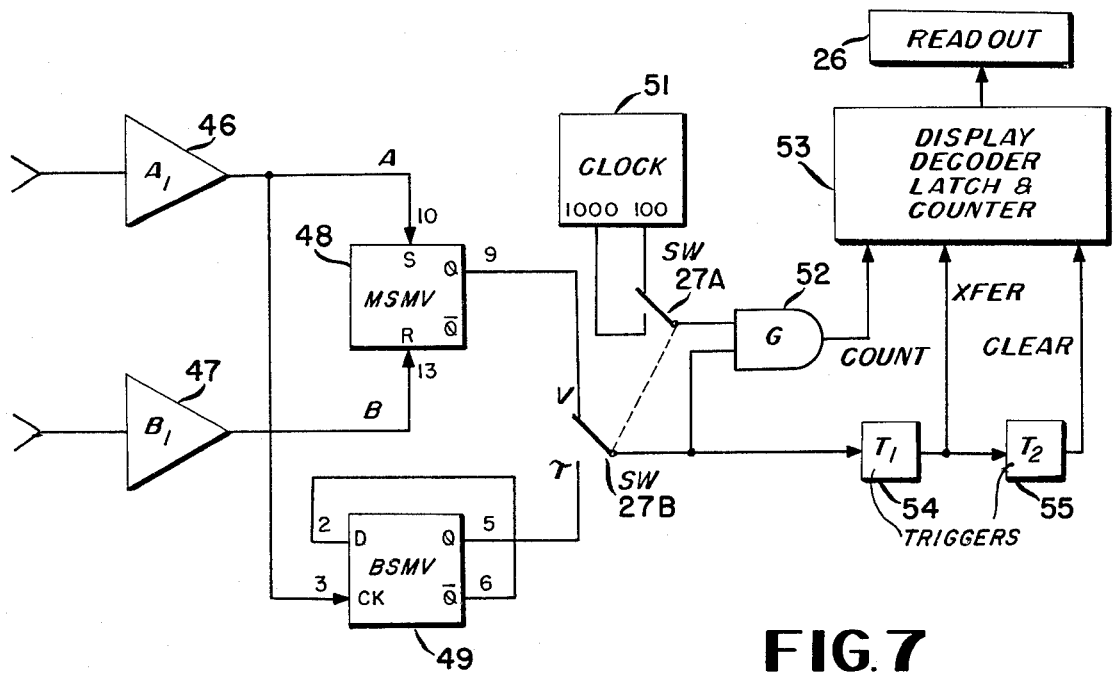
FIG. 7 is a diagrammatic view of a portion of the circuitry of the cardiovascular system of the invention.

Referring to FIG. 7, an improved circuit according to the invention as illustrated which performs with a minimum of components the desired signal processing and clock switching functions. Amplifiers 46 and 47 are pulse signal processing circuits which are connected to the photoelectric detection circuits used in the pulse pick-ups. Such circuits are conventional signal processing circuit means in the cardiovascular instrument art and may be, for example, that illustrated in FIG. 7 of U.S. Pat. No. 3,841,314 to Robert E. Page for "Pulse Activity Indicator", issued on Oct. 15, 1974. Signal processing circuits 46 and 47 are connected to an electrically operated switch circuit 48 which may be, for example, a bistable multi-vibrator such that the conduction conditions indicated at the Q output is a positive going pulse initiated by a pulse from signal processor 46 and terminated by a pulse from signal processor 47. This output is connected via switch 27B to a gate circuit 52. Gate Circuit 52 is controlled by this pulse and is used to gate the output from a clock circuit 51 to produce the desired count signal 43 which is coupled to a conventional display decoder latch and counter circuit 53. The output of this circuit is connected to a conventional digital read-out 26 as previously noted.

The output from signal processing circuit 48 is also connected to a electronic switch circuit 49 which functions as a bistable multi-vibrator which is toggled by succeeding pulses from signal processor 46. In this fasion, the Q output is a positive going pulse which is initiated and terminated by successive pulses of signal processor 46. When switch 27 is placed in the nonillustrated position, this output is connected to gate circuit 52 which then gates the 1,000 millisecond output of clock 51 via switch section 27a to function as in the case of the gate circuit 52 receiving a control signal from electrically operated switch 48. Connected in parallel with gate circuit 52 is a monostable multivibrator 54 which is toggled at the same time that the count signal is begun to produce a transfer signal which is connected to display, decoder, latch and counter circuit 53 as previously described. A similar monostable multivibrator 55 receives its output from monostable multivibrator 54 and functions in a similar fashion to produce a clear signal previously described in connection with FIGS. 5 and 6.

Figure 8:
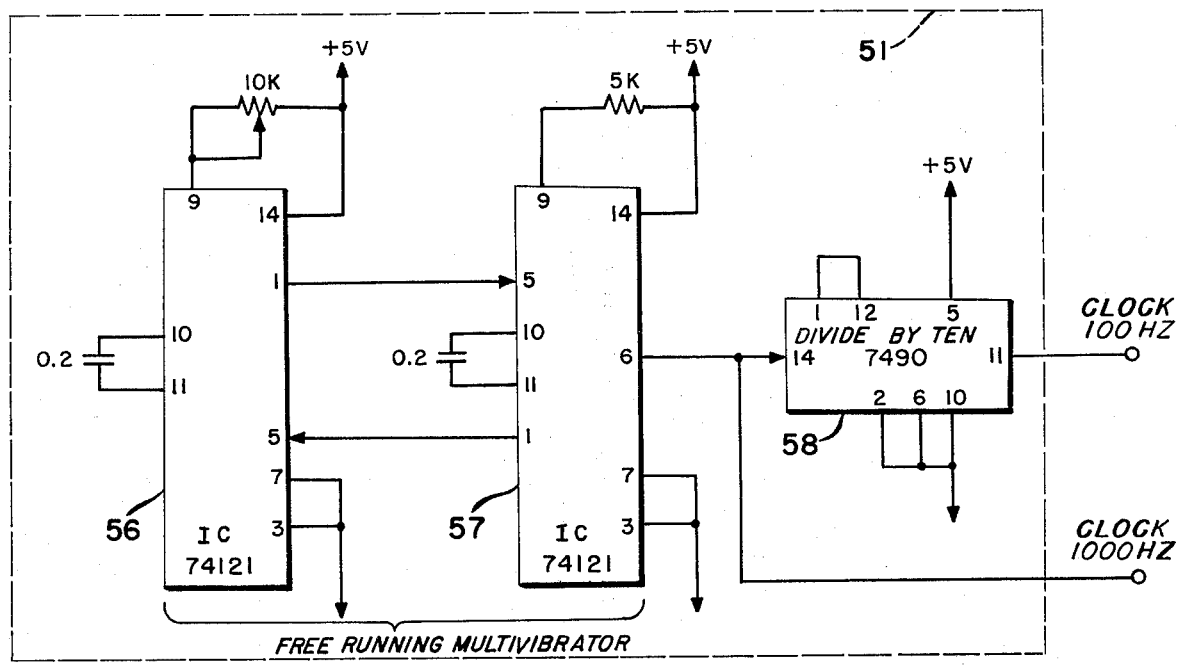
FIG. 8 is a diagrammatic representation of the clock circuit of FIG. 7.

Referring to FIG. 8, the details of clock circuit 51 are illustrated. A pair of integrated circuit logic packages 56 and 57 are connected to form a free running multivibrator which may be controlled in frequency by means of a 10 K potentiometer connected in the circuit arrangement of one of the units. With the values and circuit types illustrated, a stable clock output of 1 kilohertz is obtained. This output signal is used as the high frequency clock output and, additionally, is connected to a divided by 10 pulse divider 58 which has its output utilized as the low clock signal.

As previously described, selection between the high clock output and low clock output is accomplished by switch section 27a to provide the correct count rate for either the velocity or period mode of operation.

The aforegoing description taken together with the appended claims constitute a disclosure as to enable a person skilled in the electronics and bioinstrumentation arts and having the benefit of the teachings contained therein to make and use the invention.

Further, the structure herein described meets the aforestated objects of the invention, and generally constitutes a meritorious advance in the art unobvious to such an artisan befret of the benefit of these teachings. Obviously, many modifications and variations of the present invention are possible in the light of the above teachings, and, it is therefore understood that within the scope of the disclosed inventive concept, the invention may be practiced otherwise than specifically described.

What is claimed is:

1. In a cariovascular instrument in which the aforesaid clock circuit having
   a plurality of nonintrusive pulse transducers adapted to be placed at spaced locations on the body of a living animal for providing an electrical pulse signal corresponding to the circulatory pulse activity of said animal,
   signal processing circuit means connected to each of said nonintrusive pulse transducers for amplifying and shaping said electrical pulse signal provided thereby,
   a clock circuit for generating a timing signal having a plurality of time related pulses and two clock signal outputs, a pulse period circuit means connected to said clock circuit and to one of said signal processing circuit means for producing a pulse period control signal between adjacent pulses of said electrical pulse signal, and display means for displaying said pulse period as a time between adjacent pulses of said electrical pulse signal, the improvement comprising:

an intervalometer circuit selectively connected to said signal processing circuit means for determining the time interval between pulses of said electrical pulse signals generated by separate ones of said nonintrusive pulse transducers; said intervalometer circuit including, electrically operated switch means connected to said signal processing circuit means to receive the shaped electrical pulse signal therefrom for producing a control signal output therefrom having a pulse duration corresponding to the time separation between the electrical pulse signals, gate circuit means connected to said electrically operated switch means to receive said control signal therefrom and effectively connected between the aforesaid clock circuit and the aforesaid display means for passage of a predetermined number of clock pulses therebetween, a display decoder, latch, and counter circuit connected to said display means for holding a count signal between successive control signals;

a first monostable multivibrator connected between the control input of said gate circuit and said display decoder, latch and counter circuit for generating a transfer control signal pulse in response to control signals applied to said gate circuit;

a second monostable multivibrator circuit connected between said first monostable multivibrator and said display decoder, latch, and counter circuit for generating a clear control signal pulse in response to the generated transfer control signal pulse; and a manually operable switch connected to said gate control input and the output of said electrically operated switch means and the aforesaid pulse period circuit means such that said gate circuit may be selectively controlled by the respective control output signals therefrom and also, connected between said clock input of said gate circuit and the aforesaid clock circuit, whereby the appropriate one of said two clock outputs will be selected with the control output signals.

2. A cardiovascular instrument according to claim 1 in which the aforesaid clock circuit is constructed such that the two clock signal outputs are decimally related.

3. A cardiovascular instrument according to claim 2 in which the aforesaid clock circuit is constructed such that the two clock signal outputs have frequencies of 1,000 Hertz and 100 Hertz respectively.

* * * * *